2,730,510
Patented Jan. 10, 1956

United States Patent Office

2,730,510

DRYING COMPOSITION RESISTANT TO GAS CHECKING AND FROSTING

Hans Dannenberg, Berkeley, Calif., assignor to Shell Development Company, Emeryville, Calif., a corporation of Delaware No Drawing. Application December 24, 1952,
Serial No. 327,920

8 Claims. (Cl. 260—18)

This invention relates to polyhydric alcohol drying esters of unsaturated fatty acids having admixed therewith a particular type of salt which permits the ester to dry without gas checking and frosting. In brief, the invention pertains to the following:

A composition of matter comprising polyhydric alcohol esters of an olefinically unsaturated fatty acid containing 12 to 20 carbon atoms having dissolved therein a salt in amount which substantially prevents the esters from gas checking and frosting upon drying as a film, the salt being an alkaline earth metal of an alkylated hydroxy aromatic carboxylic acid, preferably, a calcium salt of an alkylated salicylic acid.

Certain natural and synthetic drying oils which are esters of higher unsaturated fatty acids dry as films at ordinary temperature or under baking conditions with development of an undesirable quality known as rivelling, gas checking or frosting. Although the exact reason for this unwanted result is not fully known, it causes the dried film to have a rough, wrinkled appearance which is unsuitable for many purposes. The present invention provides means for preventing or substantially lessening the gas checking or frosting, the latter being the accepted designation of the more advanced form of the former.

According to the discovery of the present invention, it has been found that by incorporating an alkaline earth metal salt of an alkylated hydroxybenzoic acid containing at least 6 carbon atoms in the alkyl substituent, particularly a calcium salt, with the drying ester, the resulting composition dries and bakes as a film without substantial development of gas checking and/or frosting. The metal salts employed in the composition are very effective which is surprising in view of substantial ineffectiveness of related calcium salts of alkylated benzoic acids which are devoid of an hydroxy group, and calcium salts of alkylated phenols which are devoid of a carboxyl group.

The alkali metal salts contained in the composition of the invention can be prepared by several methods. One method involves use of phenol as starting material. The phenol is alkylated with an olefine in known fashion such as with use of an alkylating catalyst such as sulfuric acid, phosphoric acid, zinc chloride, aluminum chloride, boron trifluoride or the like. The olefine used normally contains 6 to 20 or more carbon atoms, and preferably has the olefinic double bond in alpha position. Very suitable olefines for the alkylation are obtained by cracking paraffin wax. Although single olefines may be used, mixtures are also suitable, but it is preferred that they be of reasonably narrow range such as $C_{14}$ to $C_{18}$ olefines. The resulting alkylphenol is next converted to the dry sodium salt which can be effected by dissolving the phenol in about an equal volume of an aromatic hydrocarbon such as toluene or xylene, neutralizing the dissolved phenol with sodium hydroxide, and removing the water by distillation as its azeotrope with the hydrocarbon. The formed salt is then subjected to the Kolbe reaction wherein the salt is reacted with carbon dioxide so as to convert it to the corresponding salicylate. The desired reaction is readily effected at about 120° C. to 150° C. with the reaction mixture under a carbon dioxide pressure of from about 1 to 100 atmospheres pressure, good results being obtained at a reasonable pressure of about 200 to 400 pounds per square inch. The conversion to salicylate is usually about 70% to 80% complete in 4 to 6 hours' time. The crude product is cooled to atmospheric temperature and diluted with about three volumes of light petroleum spirit after which the sodium alkyl salicylate is extracted from the solution with an equal volume of 50% aqueous methanol. Upon acidifying the aqueous solution with hydrochloric or sulfuric acid, the free alkyl salicylic acid is obtained as a precipitate. The alkyl salicylic acid may then be converted to the neutral alkaline earth metal salt, that is to say, the compound in which only the normal salt formation has taken place at the carboxyl groups, or may be converted to the basic salt which contains a higher content of the alkaline earth metal than corresponds to the neutral salt. The neutral salt is prepared by treating the free alkyl salicylic acid with an aqueous solution containing the equivalent quantity of sodium hydroxide and the equivalent quantity of alkaline earth metal chloride, the mixture being heated to about 50° C. to 100° C. if desired, whereupon the desired neutral alkaline earth metal salt precipitates and is recovered by filtration, washing with water, and drying up to about 110° C. The basic salt is obtained by mixing the free alkyl salicylic acid with about 200% of alkaline earth metal hydroxide or oxide needed to neutralize the carboxyl groups, the hydroxide or oxide being suspended in xylene. To effect the reaction, the mixture is heated at about 80° C. to 90° C. with about 1% to 2% water being present to assist the reaction. Excess and unreacted alkaline earth metal hydroxide or oxide is filtered from the reaction mixture. The xylene is then removed by distillation in vacuum to a temperature of about 120° C.

The alkaline earth metal salts obtained by starting with phenol in the above-described method are salts of alkyl salicylic acid with the hydroxyl and carboxylic acid groups in 1,2-position. When it is desired to have these groups in 1,3- or 1,4-position, the starting material can be m-hydroxybenzoic or p-hydroxybenzoic acid, respectively. The hydroxybenzoic acid, which may if desired also be salicylic acid, is subjected to alkylation in usual fashion. The resulting alkyl hydroxybenzoic acid is then converted to the alkaline earth metal salt by the methods described above.

A great variety of particular alkaline earth metal salts can be used in the composition of the invention. While it is preferred to employ a calcium salt, the salts of other alkaline earth metals such as beryllium, magnesium, strontium and barium can also be used. Representative compounds include salts of any alkaline earth metal and 3,5-di-isopropyl salicylic acid, hexyl salicyclic acid, octyl salicylic acid, decyl salicylic acid, myristyl salicylic acid, octodecyl salicylic acid, dimyristyl salicylic acid, triethyl salicylic acid, 4-hexyl-3-hydroxybenzoic acid, 5-octyl-4-hydroxybenzoic acid, 2-decyl-4-hydroxybenzoic acid, 6-hexadecyl-3-hydroxybenzoic acid, octyl hydroxynaphthoic acid and the like. In general, it is preferred that the alkyl substituent contains 8 to 20 carbon atoms, particularly 14 to 18 carbon atoms.

The principal constituent of the composition is the drying ester which is a derivative of any polyhydric alcohol including glycerol, erythritol, pentaerythritol, diglycerol, sorbitol and the like, as well as polymeric polyhydric alcohols which are reaction products of dihydric phenols and epichlorhydrin or dichlorhydrin in alkaline medium. These last-mentioned polymeric alcohols contain alternating aliphatic chains and aromatic nuclei separated by ether-oxygen atoms and also contain about 4 to 20 esterifiable groups for reaction with the unsaturated fatty acids. The polymeric alcohols may be prepared from any of the various dihydric phenols including mononuclear phenols like resorcinol, catechol, hydroquinone, etc., or polynuclear phenols like bis-(4-hydroxyphenyl)-2,2-propane, 4,4'-dihydroxybenzophenone, bis - (4-hydroxyphenyl)-1,1-ethane, bis(4-hydroxyphenyl)-1,1-isobutane, bis-(4-hydroxyphenyl) - 2,2 - butane, bis - (4 - hydroxy - 2 - methylphenyl) - 2,2 - propane, bis - (4 - hydroxy - 2 - tertiarybutylphenyl) - 2,2 - propane, bis - (2 - hydroxynaphthylmethane)-1,5-dihydroxynaphthalene, etc. These polyhydric alcohols are made by heating at 50° C. to 150° C. the dihydric phenol with epichlorhydrin or dichlorhydrin using one to two or more moles of epichlorhydrin per mole of the dihydric phenol. Also present is a base such as sodium or potassium hydroxide in amount of 10% to 30% stoichiometric excess of the epichlorhydrin, i. e., 1.1 to 1.3 equivalents of base per mole of epichlorhydrin. The heating is continued for several hours to convert the reactant to a taffy-like consistency whereupon the reaction mixture is washed with water until free of base. Although the product is a complex mixture, the principal substances therein may be represented by the formula

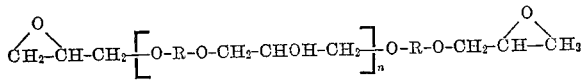

wherein R represents the divalent hydrocarbon radical of the dihydric phenol and $n$ is 0, 1, 2, 3, 4, etc. The length of the chain can be made to vary by changing the molecular proportion of epichlorhydrin and dihydric phenol. Thus, by decreasing the moles of epichlorhydrin per mole of dihydric alcohol from about two downwards toward one, the molecular weight and softening point of the product are increased. Other polymeric polyhydric alcohols of this same general type are disclosed in U. S. Patent No. 2,456,408, which also describes methods of preparing fatty acid esters therefrom, which methods are suitable for preparing other esters used in the present invention.

The nature of the glyceryl polyethers from the dihydric phenols can be better understood by considering preparation of a particular product. For convenience, this product will hereinafter be designated as polyether A.

POLYETHER A

Into a reaction vessel fitted with a stirrer, 4 mols of 2,2-bis(4-hydroxyphenyl)propane (bis-phenol) and 5.43 mols of sodium hydroxide as a 10% aqueous solution are introduced and heated to about 45° C. whereupon 5 mols of epichlorhydrin are added rapidly while agitating the mixture. The temperature is then adjusted so that the mixture is heated at about 100° C. to 105° C. for about 80 minutes. The mixture separates into a two-phase system and the aqueous layer is decanted. The resulting polyether is then washed with boiling water until neutral to litmus whereupon the resulting product is drained and dehydrated by heating at about 150° C.

The polyether has a softening point of about 100° C. (Durrans' mercury method). The molecular weight is 1400 measured ebullioscopically in ethylene dichloride so average $n=3.7$. The esterification value is 0.557 equivalent per 100 grams. The esterification value is obtained by heating a sample of the polyether with about twice the theoretical amount of higher fatty acid necessary to react with all of the hydroxyl and epoxy groups, the higher fatty acid being Armour's Neofat No. 3 consisting of about 50% linoleic acid, 40% oleic acid, and 10% stearic acid. The heating is effected at about 230° C. until a constant acid value is obtained. This may require 10 hours' heating. By back titrating the unreacted fatty acid with base, a measure is obtained from which the esterification value may be calculated. The polyether also had an epoxy value of 0.103 equivalent per 100 grams and a hydroxyl value of 0.328 equivalent per 100 grams.

In like manner, other polyethers of bis-phenol or of other dihydric phenols may be prepared which will have different molecular weights and values for $n$ depending upon the molar ratio of epichlorhydrin to dihydric phenol used in preparation thereof. This fact is illustrated with various glyceryl polyethers of bis-phenol made with variation in molar ratio as shown in the following table.

| Mol Ratio Epichlorhydrin to bis-Phenol | Mol Ratio NaOH to Epichlorhydrin | Softening Point, ° C. | Mol Wt. | $n$ | Ester Value, eq. per 100 g. |
|---|---|---|---|---|---|
| 2.6 | 1.1 | 27 | 469 | 0.5 | 0.915 |
| 2.04 | 1.05 | 42 | 710 | 1.3 | 0.961 |
| 1.57 | 1.2 | 71 | 900 | 2.0 | 0.747 |
| 1.25 | 1.1 | 100 | 1,400 | 3.7 | 0.557 |
| ---------- | ---------- | 130 | 2,900 | 9.0 | 0.532 |

Polyethers of still higher molecular weight are best obtainable by reacting a polyether of lower molecular weight with a small quantity of dihydric phenol. For example, a resinous polyether having a softening point of about 130° C., a molecular weight of 2900 and an esterification value of 0.505 equivalent per 100 grams is obtained by reacting polyether A with an added 5% of bis-phenol. This reaction is effected by heating the polyether to 150° C., and then adding the bis-phenol. The heating is continued for about two hours while stirring the reaction mass and gradually increasing the temperature to about 200° C. This product is also listed in the above table.

The glycidyl polyethers of dihydric phenols referred to herein are condensates of dihydric phenols with epichlorhydrin and are known as "ethoxyline" resins. See Chemical Week, vol. 69, page 27, for September 8, 1951.

The film-forming component of the composition of the invention are esters of a polyhydric alcohol and olefinically unsaturated fatty acid, which acid contains 12 to 22 carbon atoms and has an iodine value of 90 to 400. Although the acid is ordinarily derived from a natural oil, acids of proper chain length and iodine value from other sources are likewise suitable. It is preferred that the only unsaturation in the fatty acid be from presence therein of one or more olefinic double bonds, but the esters from acids also containing acetylenic triple-bond unsaturation are likewise applicable.

Various natural oils classified as drying or semi-drying oils are suitable sources of the unsaturated fatty acids for the esters. Ordinarily the acid from the natural oil is a mixture of different fatty acids, some saturated and some unsaturated to greater or lesser degree. The presence of saturated acids is not objectionable so long as the acid as a whole has an iodine value of at least 90. The esters thus contain acyl groups from one or more representative unsaturated acids such as hiragonic, linoleic, linolenic, elaeostearic, licanic, arachidonic, and clupanodonic. It is preferred that the acid contain one or more polyene, e. g., di- to penta-ene fatty acids. Substantial quantities of one or more of these acids occur (in the form of glycerides) in many natural oils including linseed, soybean, corn, cottonseed, hemp seed, kapok seed, herring, perilla, poppy seed, pilchard, whale, manhaden, mustard, peanut, rapeseed, salmon, sardine, walnut, dehydrated castor, rubber seed, safflower, sesame, tung and oiticica oils, all of which yield fatty acid suitable for use in the esters of the polyethers. Thus, although there is some variation due to geographical and climatic differences, linseed oil contains about 45% linolenic acid, about 25% linoleic acid, and about 20% oleic; soybean oil contains about 50% linoleic acid; tung oil contains about 80% elaeostearic acid; cotton seed oil contains about 40% linoleic acid; hempseed oil contains about 50% linoleic acid and about 25% linolenic acid; and oiticica oil contains about 10% linolenic acid and about 75% licanic acid. As previously noted, the presence in the acid of saturated acids such as lauric, myristic, palmitic, stearic and behenic is not objectionable as is also true of mono-olefinic acids such as lauroleic, myristoleic, palmitoleic, oleic, gadoleic and erucic, provided the iodine value of the acid as a whole is at least 90.

The principle of the invention is particularly applicable to esters of fatty acids containing a pair of conjugated carbon-to-carbon double bonds. Reference is made, for example, to polyhydric alcohol esters of dehydrated castor oil fatty acids which contain 9,11-octadecadienoic acid. Esters of other fatty acids of 12 to 20 carbon atoms having conjugated double bonds may be used. These others are available by additively chlorinating in known manner monoolefinic acids and then dehydrochlorinating the product according to the method of U. S. Patent No. 2,466,340. For example, 9-octadecenoic acid (oleic acid) is chlorinated to give 9,10-dichlorodecanoic acid which is then dehydrochlorinated to produce the conjugated doubly-unsaturated acid, 8,10-octadecadienoic acid. In like manner, there are obtained such representative and suitable acids as 8,10-dodecadienoic acid, 4,6-tetradecadienoic acid, 8,10-hexadecadienoic acid, 5,7-octadecadienoic acid, 8,10-octadecadienoic acid, 10,12-octadecadienoic acid, 8,10-eicosadecadienoic aid, and the like. Another source of conjugated fatty acids is treatment of natural oils, the acids therefrom or methyl esters thereof with isomerization catalysts such as aqueous or alcoholic solutions of alkalies, siliceous earths, metallic oxides and various other catalysts. In this way, various natural oils or their indicated derivatives like corn oil, cottonseed oil, soybean oil and the like have the linoleic acid contained in or combined therein converted to a product containing conjugated carbon-to-carbon double bonds.

The esters with which the invention is concerned are obtainable in usual fashion by esterifying the polyhydric alcohol with the unsaturated fatty acid. This is accomplished by heating the reactants, preferably using a slight excess, e. g., 10%, of polyhydric alcohol, at a temperature of about 150 to 300° C. and preferably in an inert atmosphere substantially devoid of oxygen such as carbon dioxide. Prepaartion of the esters in this manner is, for example, described in detail in U. S. Patent No. 2,456,408, and is equally applicable regardless of the particular polyhydric alcohol employed. Another method which is particularly adapted to preparation of the highly unsaturated esters makes use of the reaction of methyl ester of the unsaturated fatty acid with the polyhydric alcohol desired to be esterified. The polyhydric alcohol is mixed with the methyl ester of the unsaturated fatty acid and in the presence of about 0.05 to 1% of sodium methylate. The mixture is heated under reflux conditions. The formed methyl alcohol is removed as distillate during the course of the reaction.

The alkaline earth metal salts of the alkyl hydroxybenzoic acid are very efficient in preventing gas checking and frosting of the esters. Consequently, only minor amounts thereof need by mixed and incorporated with the ester in order to accomplish the result desired, namely, substantially prevent gas checking and frosting of the ester upon drying and baking, especially as a film. In general, the amount of salt which accomplishes the result desired is within the range of about 0.1 to 4%. A particularly preferred range wherein the remedial effect is most pronounced is from about 1 to 2%.

In using the composition of the invention, it is, of course, desirable to incorporate therewith other ingredients than the ester and salt. The composition is used as vehicle in combination with other ingredients such as driers, thinners, pigments, resins, and the like. Such surface-coating mixtures containing the compositions of the invention are applied as films by spraying, brushing or dipping to the surface of wood, glass or metal. The films are dried and hardened by the action of oxygen present in air which contacts the film. Evaporation removes volatile solvents from the surface-coating mixtures and drying of the resin-forming film thereof may be effected either at ordinary temperature or forced under baking conditions.

The following examples are given for the purpose of illustrating the invention, but they are not to be construed as limiting the scope to details described therein.

*Example I*

The dehydrated castor oil acid ester of the polyhydric alcohol identified as polyether A was prepared. Experience had shown that most pronounced gas checking and frosting were obtained with the ester produced at as low a temperature as possible. Use of low temperature apparently minimized the bodying affect which is known to decrease gas checking and frosting.

A charge consisting of 132 parts by weight of polyether A and 169 parts of distilled methyl ester of dehydrated castor oil fatty acid was dried by heating for 40 minutes at 140° C. and 0.5 mm. Hg pressure, with a slow stream of dry nitrogen passing through. Then 0.1% of sodium methylate in xylene suspension was added as catalyst and heating continued at 120° C. for 6 hours. The evolved methanol was collected as distillate. The product was filtered to remove the catalyst, washed with methanol to remove unreacted methyl ester, and then dissolved in xylene to a concentration of 50%.

To portions of the solution of ester were added the calcium salts listed in the table below. The percentage of added salt was based on the weight of ester. The $C_{14-18}$ alkyl salicylic acid salt was one which had been prepared by alkylating phenol with a fraction of $C_{14-18}$ olefines from cracked wax, and converting the alkyl phenol to the corresponding salicylic acid. The salt was basic and contained 50% more calcium than the neutral salt. The compositions were flowed out on glass panels, the films air dried for 2 hours, and then baked at 150° C. for 30 minutes in an air oven. The appearance of the baked films were then noted and are tabulated below.

| Salt | Percent | Film Appearance After Baking |
| --- | --- | --- |
| None | 0.0 | Frosted. |
| 50 percent basic calcium salt of $C_{14-18}$ alkyl salicylic acid | 0.4 | Smooth. |
| Calcium octylphenate | 0.4 | Frosted. |
| Calcium dodecylbenzoate | 0.4 | Do. |

*Example II*

In a glass apparatus equipped with phase separating condenser, stirrer, and nitrogen bubbler, a mixture of 125 parts by weight of xylene as azeotroping agent, 1160 parts by weight of polyether A and 880 parts by weight of linseed oil fatty acid having an acid number of 199 and an iodine value of 184 were heated to 250° C. in 90 minutes and held at 250° C. for 2 hours and 30 minutes. The product after dilution with xylene to a non-volatile or polyester content of 50%, and filtration through Super-cel, had an acid number of about 3 mg. KOH per g. on solids.

To a portion of the solution was added the neutral calcium salt of myristyl salicylic acid containing 5.59% calcium in amount of 1% on the basis of the ester. A film of 3 mil wet thickness was prepared on a tin plated sheet of steel with a spray gun along with a corresponding film of the ester solution containing no calcium salt. The applied films were allowed to dry for 15 minutes at room temperature and were then stored in a direct fired gas oven at 150° C. for 30 minutes. The control panel was rivelled while the film containing the calcium salt was smooth.

*Example III*

The two solutions described in Example II were subjected to the webbing test described in B. S. Specification No. 256—1936: Appendix C. In this method, glass slides are coated with the varnish under test and then maintained at 38° C. for 24 hours (or until rivelling or webbing occurs) in a six inch square copper oven heated through a standard aperture in the base by a small gas flame. Again it was found that the control composition free of calcium salt was rivelled while the composition containing the calcium salt was smooth and free of webbing.

*Example IV*

The test described in Example III was repeated except that 2% of the calcium mono $C_{14}$ alkyl salicylate was used with the ester. The tested film containing the calcium salt was smooth and free of rivelling.

*Example V*

A solution was prepared containing the linseed oil fatty acid ester described in Example II which was modified with melamine-formaldehyde resin in a weight ratio of ester to resin of 70:30. To portions of the solution were added 1% and 2% of the calcium mono-$C_{14}$ alkyl salicylate on the basis of the varnish solids. These along with a control containing no calcium salt were subjected to the webbing test mentioned in Example III. No rivelling developed in the films containing the calcium salt, but the control was rivelled.

I claim as my invention:

1. A process for preparing a composition which is resistant to gas checking and frosting when hardened as a film which comprises mixing about 0.1% to 4% by weight of an alkaline earth metal salt of an alkyl hydroxy aromatic monocarboxylic acid containing at least 6 carbon atoms in the alkyl substituent with a drying ester of polymeric polyhydric alcohols having alternating aliphatic chains and aromatic nuclei united through ether oxygen and olefinically unsaturated fatty acid of 12 to 20 carbon atoms and an iodine number of at least 90.

2. A process for preparing a composition which is resistant to gas checking and frosting when hardened as a film which comprises mixing about 0.1% to 4% by weight of an alkaline earth metal salt of an alkylated hydroxybenzoic acid containing 8 to 20 carbon atoms in the alkyl substituent with a drying ester of an olefinically unsaturated fatty acid of 12 to 20 carbon atoms and an iodine number of 90 to 400, and polymeric polyhydric alcohols having alternating aliphatic chains and aromatic nuclei united through ether oxygen, which ester contains from 4 to 20 ester groups per molecule.

3. A process for preparing a composition which is resistant to gas checking and frosting when hardened as a film which comprises mixing about 1% to 2% by weight of a calcium salt of an alkyl salicylic acid containing 14 to 18 carbon atoms in the alkyl group with a drying ester of linseed oil fatty acid and polymeric polyhydric alcohols having alternating glyceryl radicals and 2,2-bis(4-phenylene)propane groups united through ether oxygen, which ester contains from 4 to 20 ester groups per molecule.

4. A process for preparing a composition which is resistant to gas checking and frosting when hardened as a film which comprises mixing about 1% to 2% by weight of a calcium salt of an alkyl salicylic acid containing 14 to 18 carbon atoms in the alkyl group with a drying ester of dehydrated castor oil fatty acid and polymeric polyhydric alcohols having alternating glyceryl radicals and 2,2-bis(4-phenylene)propane groups united through ether oxygen, which ester contains from 4 to 20 ester groups per molecule.

5. A composition of matter comprising a drying ester of polymeric polyhydric alcohols having alternating aliphatic chains and aromatic nuclei united through ether oxygen esterified with an olefinically unsaturated fatty acid of 12 to 20 carbon atoms and an iodine number of at least 90, said ester having admixed therewith an alkaline earth metal salt of an alkyl hydroxy aromatic acid containing at least 6 carbon atoms in the alkyl substituent, the salt being present in amount of from about 0.1% to 4% by weight which substantially prevents gas checking and frosting of the composition when hardened as a film.

6. A composition of matter comprising an alkaline earth metal salt of an alkylated hydroxybenzoic acid containing 8 to 20 carbon atoms in the alkyl substituent admixed into a drying ester of an olefinically unsaturated fatty acid of 12 to 20 carbon atoms and an iodine number of 90 to 400, and polymeric polyhydric alcohols having alternating aliphatic chains and aromatic nuclei united through ether oxygen, which ester contains from 4 to 20 ester groups per molecule, the salt being present in amount of from about 0.1% to 4% by weight which substantially prevents gas checking and frosting of the composition upon hardening as a film.

7. A composition of matter comprising about 1% to 2% by weight of a calcium salt of an alkyl salicylic acid containing 14 to 18 carbon atoms in the alkyl group admixed into a drying ester of linseed oil fatty acid and polymeric polyhydric alcohols having alternating glyceryl radicals and 2,2-bis(4-phenylene)propane groups united through ether oxygen, which ester contains from 4 to 20 ester groups per molecule.

8. A composition of matter comprising about 1% to 2% by weight of a calcium salt of an alkyl salicylic acid containing 14 to 18 carbon atoms in the alkyl group admixed into a drying ester of dehydrated castor oil fatty acid and polymeric polyhydric alcohols having alternating glyceryl radicals and 2,2-bis(4-phenylene)propane groups united through ether oxygen, which ester contains from 4 to 20 ester groups per molecule.

References Cited in the file of this patent

UNITED STATES PATENTS

| | | |
|---|---|---|
| 1,933,520 | Bruson | Oct. 31, 1933 |
| 2,456,408 | Greenlee | Dec. 14, 1948 |